Dec. 15, 1953
G. SMAL
2,662,424
MACHINE FOR THE SHAPING OF METAL PIECES, MORE PARTICULARLY OF SAW TEETH
Filed Jan. 30, 1951
3 Sheets-Sheet 1
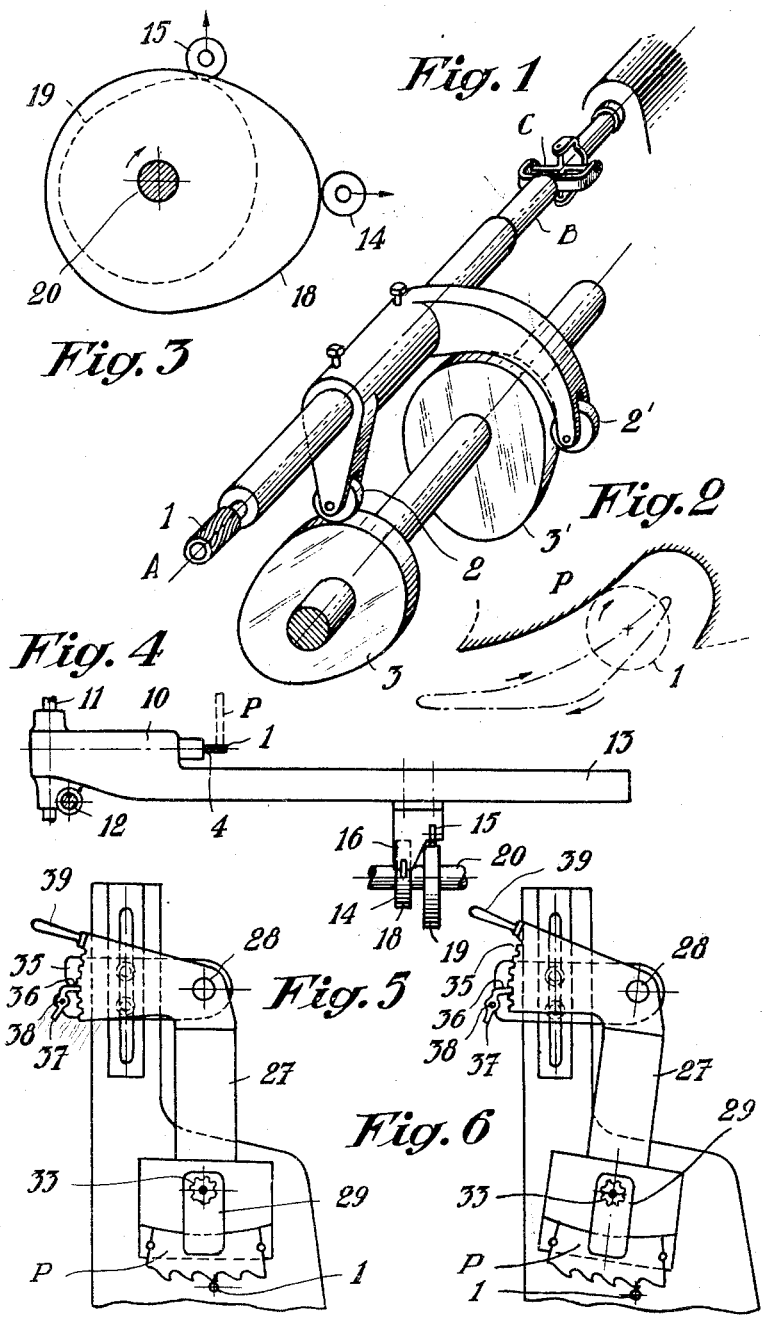
INVENTOR:
Gilles Smal,
PER:
His Agent.

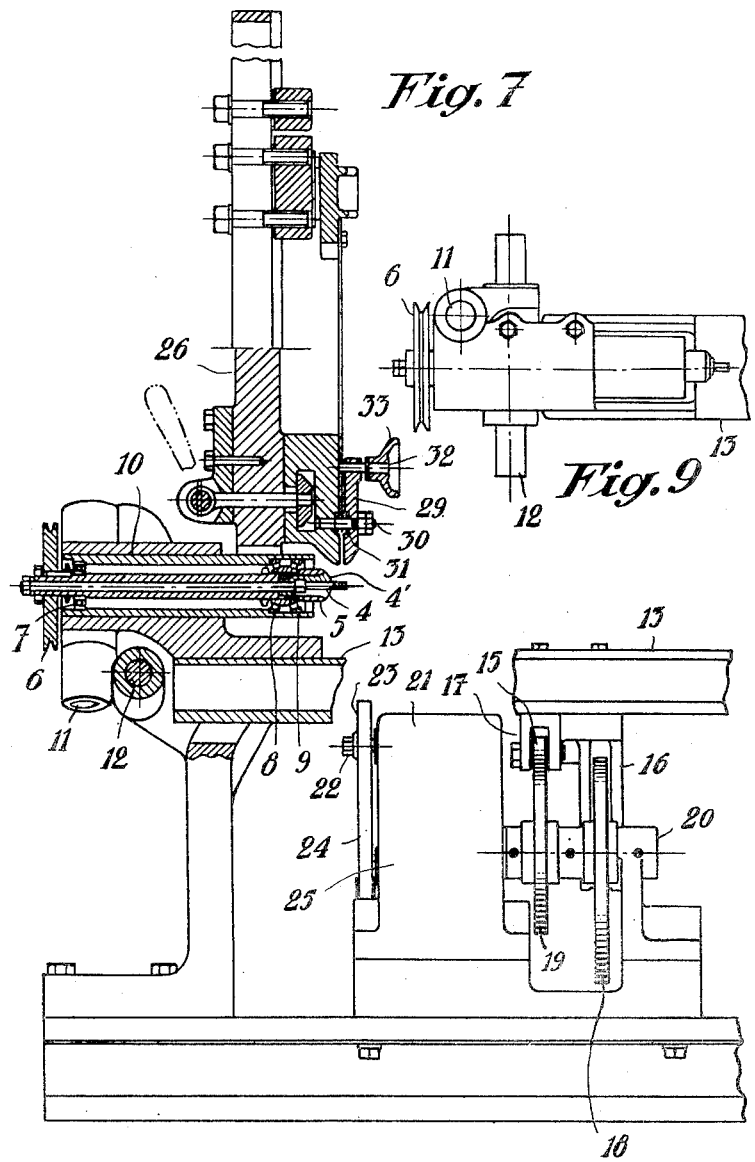

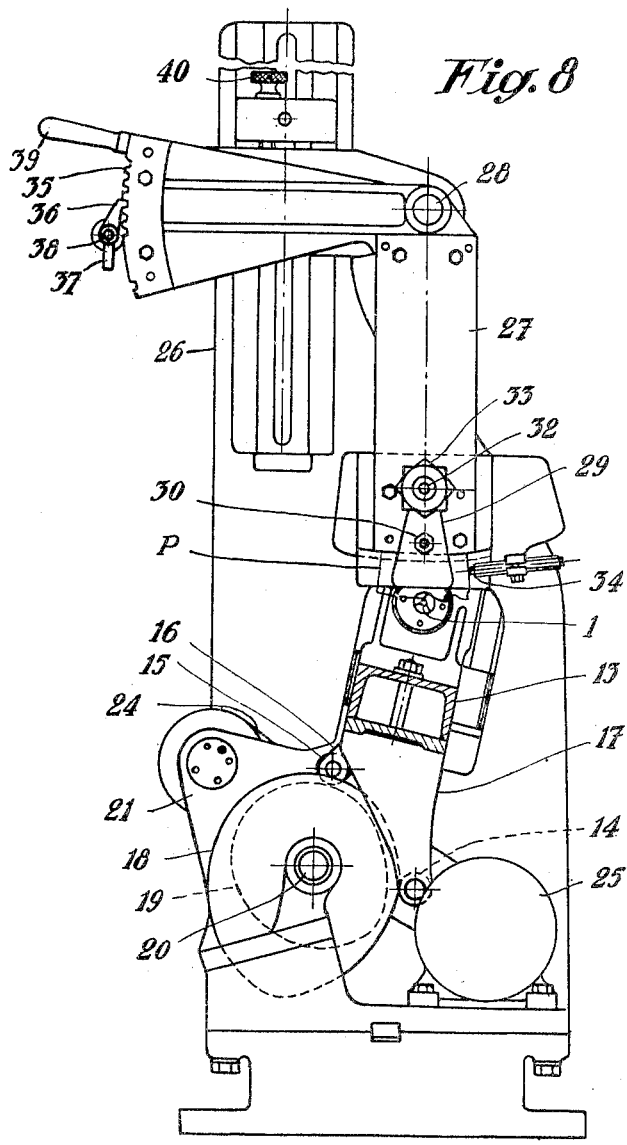

Patented Dec. 15, 1953

2,662,424

UNITED STATES PATENT OFFICE 2,662,424

MACHINE FOR THE SHAPING OF METAL PIECES, MORE PARTICULARLY OF SAW TEETH

Gilles Smal, Herstal, Belgium

Application January 30, 1951, Serial No. 208,458

Claims priority, application Belgium February 3, 1950

5 Claims. (Cl. 76—37)

The invention relates to a machine for shaping, respectively for cutting metal pieces of practically any shape but particularly the teeth of segments of circular saws.

The machine is characterized in that it makes use of a rotary tool the shaft of which is imparted a swinging movement round a fictive centre that can be built up by a universal joint, the said shaft being, on the other hand, driven by at least one cam. The cam drive is preferably such that the path of the tool is a complete or closed curve and this condition will be generally fulfilled by the simultaneous application of two cams, acting at the same time in two different directions. The curve described by the tool, and consequently the profile sectioned, respectively cut, can be varied infinitely and is dependent on the shape and the relative position of the driving cams, respectively of any equivalent part adapted to make the shaft of the rotary tool swing round its fictive centre.

In a general way, the tool is arranged at the end of a shaft to which a rotary movement is directly given. This shaft rests in a universal joint sleeve, and consequently can swing in every direction. This sleeve is fixed to a beam which serves as a support of the shaft of the two rollers, the position of which is perfectly determined. Each roller is in contact with a cam the common shaft of which is actuated by a suitable driving device. The piece is fixed to an adjustable support. The cams will be determined preferably in such a manner that after one complete revolution of their driving shaft, the rotary tool has performed a complete cycle, that is to say, the predetermined path for which the said cams have been provided. In this way the tool will automatically return to its starting point and be ready for another operation, respectively another cycle.

If the application of this machine, for example, to the toothing of circular saw segments is considered, the cams may be adjusted in such a manner that after one complete revolution one tooth is completely cut and the tool is ready to begin the cycle required for the cutting of the next tooth. It is then necessary to shift the segment, by hand or mechanically, to the angle required to allow the tool to cut a second tooth, and so on until the cutting of all the teeth is accomplished. This means is extremely simple and very rapid and the correct positioning of the segment is almost instantaneous and systematic when the process, which is the object of a special patent filed in the name of the applicant, is employed.

Figure 1 is a very diagrammatic view of the process, principal object of the invention;

Figure 2 shows the diagram of the movement of the tool when the process of the invention is applied;

Figure 3 is a diagrammatic view of the profile of the two cams used to obtain the diagram, object of Figure 2;

Figure 4 is a diagrammatic view of the essential driving parts applying the process shown in Figure 1;

Figures 5 and 6 diagrammatically show, in two different positions, a device for the fixing of the piece to be cut;

Figure 7 is a side view, with a partial vertical section, of the essential parts of a complete machine;

Figure 8 is a front view of the essential parts of the machine of Figure 7;

Figure 9 is a plan view of the essential parts of the support of the tool of the machine shown in Figures 7 and 8.

As shown in Figure 1, the tool 1, for example of the cutter (with a single knife) type, carries out a complex movement which is the resultant of a rotation round its longitudinal axis A—B and of an oscillation of the said longitudinal axis A—B round a fictive centre, shown in this figure, by a joint C; this swinging movement is, for example, produced by the fact that two rollers 2—2' are actuated by two cams respectively 3 and 3'. If in these conditions, the rotary tool 1 is considered, it will be remarked that it will be possible to make it describe any path by giving the cams 3 and 3' a conformation in accordance therewith. This process of cutting, respectively of toothing, is very simple, the machines that apply this process being themselves relatively simple, strong and, with respect to their working, particularly rapid and easy. In the following description of the machine, the application of the said process to the toothing of saw segments will particularly be considered, the application being nevertheless given only by way of example. As shown in the rough drawings, objects of Figures 2, 3, 4, 5 and 6 and in the designs showing the application, objects of Figures 7, 8 and 9 of such a shaping machine, respectively a toothing machine may comprise, as principal part, a tool 1, for example a cutter (with a single knife) the shaft of which is gripped by a clamp 4' on a tubular sleeve 5, to which a rotary movement is imparted by a keyed pulley 6. The tubular sleeve 5 itself rests on the bearings 7, 8 and 9 in an outer tubular sheath 10. This sheath is mounted in such a way as to be able to swing, at the same time, round a vertical shaft 11 and a horizontal shaft 12, the whole forming a universal joint. The outer tubular sheath 10 is made fast to a beam 13, which therefore may equally be considered as being able to swing in all directions round the fictive centre of the universal joint 11—12. On the beam 13 rest two rollers 14 and 15, of which the shafts carry at their ends two arms, respectively 16 and 17, the sizes and the shape of which will depend on the shape of the cams, respectively 18 and 19, on which rest the said rollers 14 and 15. These cams are mounted on a common shaft 20 connected to the outlet shaft of a speed reducer 21, the driving shaft 22 of which is directly actuated by a motor 25 by means of a pulley 23 and a chain 24. The frame of the machine is extended above by an upright 26 which serves as a rest for the device for fixing the piece P to be cut, in the present instance a saw segment. This fixing means comprises, as principal part, an angle-lever 27 adapted to swing round a shaft 28 and presenting a vertical and a horizontal arm or approximately such. The vertical arm bears, in its lower part, a jaw 29 resting on a pin 30 partly surrounded by a pressure spring 31 and, above, this jaw is traversed by the threaded end 32 of a clamping handle 33. An abutment, duly adjustable, allows of the fixing of the piece P to be cut almost instantaneously in the correct position. The quick manoeuvering of the clamping handle 33 allows also of the fixing of the said piece P as quickly as correctly. The horizontal arm of the angle-lever 27 presents a toothed segment 35 engaged by a tooth 36 forming a prolongation of a manipulation lever 37 linked to the spindle 38. The toothed segment 35 is fixed to a manipulation lever 39. The result is that the toothed segment 35 may very quickly be moved, tooth by tooth, in front of the clutch pawl 36 and steadied in any position marked by the teeth of the said toothed segment 35. To each angular displacement of the horizontal arm of the angle-lever 27 corresponds an identical angular displacement of the vertical arm of the said angle-lever and, consequently, also of the piece P. This piece P therefore undergoes, in relation to the tool, an angular displacement and also a linear displacement, so that, according to the profile of the toothed segment 35, the piece P may periodically be displaced in a predetermined manner in proportion to the shaping, respectively the toothing to be done. Such a machine can be completed by any additional means, such as a regulation means, respectively a micro-metric clamping means 40, and by all other complementary means appertaining to current mechanics.

The machine thus built up is extremely simple, if the relatively very complex cuttings that may be effected in so economical and rapid a manner, is taken into consideration. The angle-lever 27 can be adjusted in height, that is to say, that the initial position, before the tool is set in motion, is perfectly adjustable, hence the depth of the bite of the tool is equally capable of adjustment, that is to say also the depth of the teeth cut within a certain limit. The adjustment of the angle-lever 27 is necessitated by the positioning of the shaft 28, in relation, in the case of the toothing of a saw segment, to the diameter to the outer curve of the segment and the adjustment of the depth of the bite of the tool is very limited, since the profile described by the tool in its complete revolution must be used to the maximum.

Evidently it will be possible to adapt such a machine by the application of all parts or devices equivalent to those described or capable of exercising an equivalent function.

The working of the described machine is extremely simple and moreover similar to that which has been set forth in the general description of the process.

In fact the beam 13 is acted upon at the same time by the two cams 18 and 19. Owing to the universal joint device 11—12, the said beam can oscillate in proportion to the movements imparted to it by the cooperation of the two cams. This beam automatically actuates, in the same movements, the tool 1, of which the amplitudes will be inversely proportional to the distance separating the cams of the fictive centre of oscillation. The result will be that the said tool will cut the material according to the profiles determined by the profile of the drive cams 18 and 19. It will therefore be enough to modify this profile in order to modify the profile produced by the tool, respectively to modify the profile of the toothing. Now these variations of the path of the tool are necessitated by the fact that the pitch of teeth varies according to the diameter of the saw and of the number of teeth cut in this saw.

What I claim is:

1. In a machine for cutting the teeth of a circular saw segment, in combination, clamping means operable for maintaining said segment releasably in fixed position, a cutter disposed adjacent said position and being revoluble about its axis and being at the same time, though independently, movable in a closed curved path, about a center, for tooth cutting in said segment, means for supporting said cutter, driving means operable to rotate said cutter and in driving connection with said supporting means, a rotatable shaft spaced from said cutter, two cams mounted on said shaft and rotatable therewith, each cam having a profile different from that of the other and being angularly offset against the other, and an extension mounted on said supporting means and including two rigidly interconnected cam followers, each follower engaging a cam displacing said cutter in a compound movement describing said closed curve about said center.

2. In a machine, as claimed in claim 1, together with, said supporting means comprising a universal joint including a horizontal shaft, a vertical shaft, and a movable holder having sleeves engaging said shafts, said holder being turnable about the axes of said shafts and clamping said cutter for guiding the same about said shaft axes during the displacement brought about by the cam and cam follower action.

3. In a machine for the shaping of a metal piece, more particularly of a saw segment, a support for said piece, means for rotating a tool about its longitudinal axis, means for displacing the said rotary tool in a swinging movement about a center, the said support comprising at least one upright bearing, an angle-lever adapted to swing about a horizontal axis, said angle-lever having a vertical arm supporting fixedly the piece and a horizontal arm including means for adjusting the angular position of the piece in relation to the tool.

4. In a machine for the shaping of a metal piece, more particularly of saw teeth, a support for said piece, means for rotating a tool about its longitudinal axis, means for displacing the said rotary tool in a swinging movement about a center, the said support comprising at least one upright bearing, an angle-lever adapted to swing about a horizontal axis, said angle-lever having a horizontal arm including means for adjusting the angular position of the piece in relation to the tool, and a vertical arm comprising at least one jaw for fixing the piece and a regulatable abutment for controlling the position of the piece.

5. In a machine for the shaping of a metal piece, more particularly of saw teeth, a support for said piece, means for rotating a tool about its longitudinal axis, means for displacing the said rotary tool in a swinging movement about a center, the said support comprising at least one upright bearing, an angle-lever adapted to swing about a horizontal axis, said angle-lever having a vertical arm operable for fixing the piece, and a horizontal arm including means for adjusting the angular position of the piece in relation to the tool, said adjusting means comprising a toothed segment, a handle fixed to said toothed segment, and a movable pawl operable to engage releasably a tooth of said segment to adjust the position of said support.

GILLES SMAL.

References Cited in the file of this patent

UNITED STATES PATENTS

| Number | Name | Date |
| --- | --- | --- |
| 1,646,870 | Powers | Oct. 25, 1927 |
| 1,874,315 | Laurent | Aug. 30, 1932 |
| 2,410,274 | Drake | Oct. 29, 1946 |
| 2,419,543 | Ellis et al. | Apr. 29, 1947 |
| 2,470,021 | D'Avaucourt | May 10, 1949 |
| 2,487,201 | Van Buren | Nov. 8, 1949 |
| 2,509,070 | Musyl | May 23, 1950 |

FOREIGN PATENTS

| Number | Country | Date |
| --- | --- | --- |
| 371,164 | Great Britain | Apr. 21, 1932 |
| 672,577 | Germany | Mar. 4, 1939 |
| 682,170 | Germany | Oct. 9, 1939 |